(12) United States Patent
Donelson et al.

(10) Patent No.: US 7,312,262 B2
(45) Date of Patent: Dec. 25, 2007

(54) METHODS AND COMPOSITIONS FOR MICROSURFACING

(75) Inventors: Michael James Donelson, Springfield, MO (US); Terrence Christopher Donelson, Springfield, MO (US); David Carr Donelson, Springfield, MO (US)

(73) Assignee: Donelson Construction Co., LLC, Clever, MO (US)

( * ) Notice: Subject to any disclaimer, the term of this patent is extended or adjusted under 35 U.S.C. 154(b) by 354 days.

(21) Appl. No.: 10/806,266

(22) Filed: Mar. 22, 2004

(65) Prior Publication Data

US 2005/0209376 A1    Sep. 22, 2005

(51) Int. Cl.
*C08L 95/00* (2006.01)

(52) U.S. Cl. .............. 524/60; 524/2; 241/14; 241/24.1; 241/27

(58) Field of Classification Search ............ 524/60–61, 524/2; 241/14, 24.1, 27
See application file for complete search history.

(56) References Cited

U.S. PATENT DOCUMENTS

| | | | |
|---|---|---|---|
| 1,319,918 A | 10/1919 | Zimmer | |
| 1,320,672 A | 11/1919 | Black et al. | |
| 3,513,005 A | 5/1970 | Bradshaw et al. | |
| 4,094,697 A | 6/1978 | Rostler | |
| 4,373,960 A | 2/1983 | Ward, Jr. | |
| 4,462,840 A | 7/1984 | Schilling et al. | |
| 4,547,224 A | 10/1985 | Schilling | |
| 5,089,052 A | 2/1992 | Ludwig | |
| 5,219,901 A | 6/1993 | Burke et al. | |
| 5,223,031 A * | 6/1993 | Sugi et al. | 106/277 |
| 5,352,062 A | 10/1994 | Yoshida et al. | |
| 5,443,632 A | 8/1995 | Schilling | |
| 5,544,971 A | 8/1996 | Huege et al. | |
| 5,711,796 A | 1/1998 | Grzybowski et al. | |
| 5,925,695 A | 7/1999 | Ohtsuka et al. | |
| 5,928,418 A | 7/1999 | Tamaki et al. | |
| 2002/0115752 A1 | 8/2002 | Takamura et al. | |
| 2003/0044522 A1 | 3/2003 | Isozaki | |
| 2003/0061968 A1 | 4/2003 | Matherly et al. | |
| 2003/0061970 A1 | 4/2003 | De Buen-Unna et al. | |
| 2006/0127572 A1* | 6/2006 | Raynaud | 427/212 |

FOREIGN PATENT DOCUMENTS

KR    2001019265    *    3/2001

OTHER PUBLICATIONS

International Slurry Surfacing Association; What is Microsurfacing? (3 pgs.); http://www.slurry.org/mswhat.htm.
International Slurry Surfacing Association; Recommended Performance Guidelines for Emulsified Asphalt Slurry Seal (16 pgs.); A105 (Revised) May 2003; http://www.slurry.org/mswhat.htm.
International Slurry Surfacing Association; What is Microsurfacing? (3 pgs.); http://www.slurry.org/mswhat.htm, Mar. 2004.

* cited by examiner

*Primary Examiner*—Peter Szekely
(74) *Attorney, Agent, or Firm*—Armstrong Teasdale LLP

(57) ABSTRACT

A composition for microsurfacing of pavement is described. The composition includes a polymer-modified emulsion asphalt oil, water, cement, and crushed aggregate. The crushed aggregate includes a first portion having an L.A. abrasion resistance which is higher than an L.A. abrasion resistance of a second portion of the crushed aggregate.

53 Claims, 2 Drawing Sheets

METHODS AND COMPOSITIONS FOR MICROSURFACING

BACKGROUND OF THE INVENTION

This invention relates generally to paved surfaces, and more specifically, to compositions and methods for microsurfacing of paved surfaces.

One of the most versatile tools for road maintenance is microsurfacing. Microsurfacing is a polymer-modified cold-mix paving system that can remedy a broad range of pavement problems, for example, on streets, highways, and airfields. Similar to a slurry seal, known compositions for microsurfacing begin as a mixture of dense-graded aggregate, asphalt emulsion, water, and mineral fillers. While conventional slurry seal is used around the world as an economical treatment for sealing and extending the service life of both urban and rural roads, microsurfacing has added capabilities, due to the use of high-quality, carefully monitored materials, including advanced polymers and other modern additives.

Originally, microsurfacing was developed for use in thicker applications, where it could be applied in narrow courses for wheel ruts, while not destroying the expensive road striping line. As scientists used highly selected aggregates and bitumen, and then incorporated special polymers and emulsifiers that allowed the product to remain stable even when applied in multi-stone thicknesses, the microsurfacing compositions resulted. Microsurfacing now is recognized not only as the most cost-effective way to treat the surface wheel-rutting problem, but also a variety of other road surface problems.

Known microsurfacing compositions are made and applied to existing pavements by a specialist machine, which carries all components, mixes them on site, and spreads the mixture onto the road surface.

As used herein, the term "L.A.", refers to an amount of fine material dislodged from a coarse aggregate during the impact phase of a test used to determine the abrasion resistance of the coarse aggregate to impact in a rotating cylinder containing metallic spheres. L.A. is reported in terms of percent loss and the test method is sometimes referred to as the Los Angeles Rattler Test.

BRIEF DESCRIPTION OF THE INVENTION

In one aspect, a composition for microsurfacing pavement is provided. The composition comprises a polymer-modified emulsion asphalt oil, water, cement, and crushed aggregate comprising a first portion and a second portion. The first portion has an L.A. abrasion resistance that is higher than the L.A. abrasion resistance of the second portion.

In another aspect, a method for microsurfacing a surface is provided. The method comprises preparing a crushed aggregate which includes a first portion having a first L.A. abrasion resistance and a second portion having a second L.A. abrasion resistance, mixing the crushed aggregate with a polymer-modified emulsion asphalt oil, water, cement, and applying the mixture to the surface to be microsurfaced. The first L.A. abrasion resistance is higher than the second L.A. abrasion resistance.

In still another aspect, a crushed aggregate for utilization in microsurfacing of pavement is provided. The crushed aggregate comprises a first portion and a second portion. The first portion has a L.A. abrasion resistance that is higher than the L.A. abrasion resistance of the second portion.

DETAILED DESCRIPTION OF THE INVENTION

Figure 1:
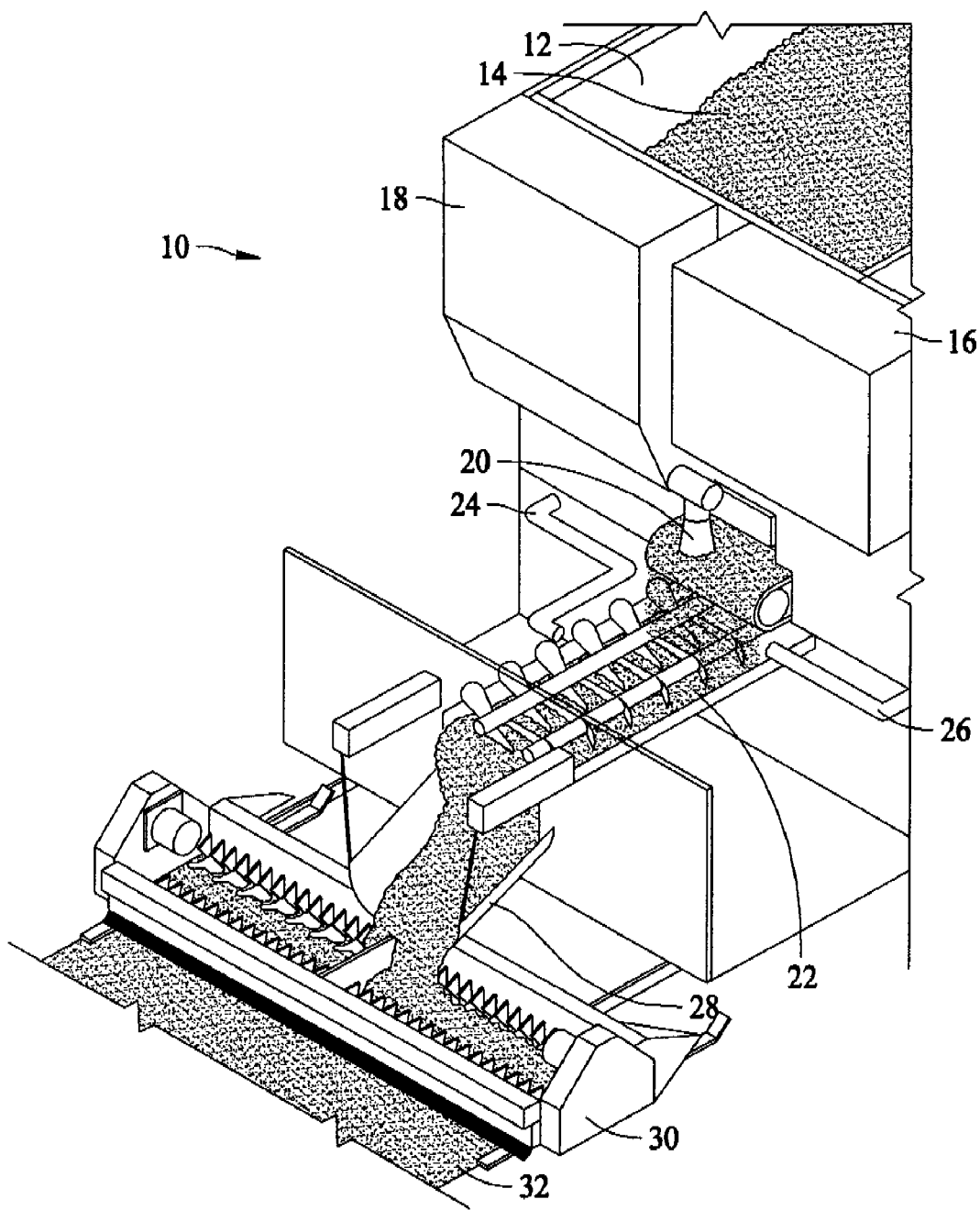
FIG. 1 is a diagram illustrating microsurfacing.

FIG. 1 illustrates a microsurfacing application being performed by a microsurfacing machine 10. Machine 10 includes an aggregate bin 12 into which an aggregate 14 is placed. Machine 10 also includes a filler bin 16 and a storage bin 18 which contains, for example, cement. A modified emulsion asphalt oil is added from a tank (not shown), and a water/additive blend is provided from one or more tanks (not shown) on machine 10. The emulsion asphalt oil is modified with one or both of a polymer and a latex. An example additive is a set-control agent, which is added in such a quantity as to produce a one hour set and does not vary more than plus or minus one percent. While referred to herein as microsurfacing machine 10, the methods and compositions described herein are also applicable to a slurry system which is a slower setting, non-stacking mix system that is similar to microsurfacing machine 10.

In one embodiment, aggregate 14 is 100% Burlington-Keokuk limestone that has been crushed. The cleanliness of aggregate 14, or lack of clay dirt particles therein, is measured by a sand equivalent value of soils and fine aggregate test and reported in terms of percent. The higher the percentage number, the cleaner aggregate 14. The ISSA (International Slurry Surfacing Association) is the commonly known industry leader for microsurfacing and slurry surfacing applications throughout the world. The ISSA has an industry minimum standard for aggregate cleanliness of 65%. Aggregate cleanliness, or sand equivalent value, for aggregate 14 is typically above 80%. Sand is typically not added to aggregate 14, but embodiments exist where sand is added. In one embodiment, although sand is not added to aggregate 14, crushing of the limestone for aggregate 14 follows the gradation detailed, and generally is considered to be "sand" since it is typically close to meeting most sand specifications as well as the sand equivalent value of soils and fine aggregate test. In alternative embodiments, crushed aggregate 14 is from one or more of the Burlington-Keokuk limestone formation, the Elsey-Reeds Spring formation, and the Pierson formation.

One test method used to determine the resistance of coarse aggregate to impact in a rotating cylinder containing metallic spheres is known as the Los Angeles Rattler Test. The amount of fine material "lost" during the impact phase of the test from the coarse aggregate is known as L.A., and is reported in terms of percent loss. The term, "L.A.", as used herein, is consistent with the above definition.

Metered, crushed aggregate 20 is dropped into a mill 22 where metered microsurfacing emulsion 24 from bins 16 and metered water and additive 26 from bins 18 are combined to form a microsurfacing composition 28. Microsurfacing composition 28 is passed into full-width surfacing box 30 which applies microsurfacing composition 28 to form surface 32.

The materials which constitute microsurfacing composition 28 are continuously and accurately measured, and then thoroughly combined in mill 22 of microsurfacing machine 10. As machine 10 moves forward, microsurfacing composition 28 is continuously fed into full-width surfacing box 30 which spreads the width of a traffic lane in a single pass.

Machine 10 can also be configured with specially engineered "rut" boxes (not shown), which are designed to deliver the largest particles of aggregate 14 into the deepest part of a rut in the road surface to give maximum stability in the wheel path. Edges of microsurfacing composition 28 are automatically feathered. The new surface is initially a dark brown color and changes to the finished black surface as the water is chemically ejected and surface 32 cures, permitting traffic within one hour in some cases.

Continuous-load pavers (e.g. machine 10) utilize support units which bring the materials to the job site to load machine 10 while it is microsurfacing, thus maximizing production and minimizing transverse joints in surface 32.

In one embodiment, as described above, microsurfacing composition 28 is formed utilizing a polymer-modified emulsion asphalt oil, water, cement, and a chemical additive which controls a setting time of microsurfacing composition 28. Referring to aggregate 14, in one embodiment, aggregate 14 includes parent stone from the Burlington-Keokuk limestone formation. From the Burlington-Keokuk limestone formation, two ledges of stone that have different hardness are combined. The Elsey-Reeds Spring formation and the Pierson formation have similar qualities.

In one specific embodiment, aggregate 14 includes approximately ⅔ by weight stone with an L.A. abrasion resistance between 28 and 34 percent inclusive and approximately ⅓ by weight stone with an L.A. abrasion resistance between 21 and 27 percent inclusive. The smaller the L.A. abrasion resistance percentage, the harder the stone. Stone with an L.A. of 24% is a comparatively hard stone. The above described combination gives aggregate 14 stability and strength. The softer stone within aggregate 14 (e.g., an L.A. of about 31%) is still fairly hard, but is slightly outside the recommended ISSA spec. of 30% maximum, which allows the larger stones to continue to break off new sharp edges over time thereby maintaining surface skid resistance over a longer period of time.

In another specific embodiment, aggregate 14 includes approximately ⅔ by weight stone with an L.A. abrasion resistance between 30 and 32 percent inclusive and approximately ⅓ by weight stone with an L.A. abrasion resistance between 23 and 25 percent inclusive. In still another specific embodiment, aggregate 14 includes approximately ⅔ by weight stone with an L.A. abrasion resistance of about 31 percent inclusive and approximately ⅓ by weight stone with an L.A. abrasion resistance of about 24 percent inclusive.

Other embodiments exist where aggregate 14 includes about one-third by weight of crushed aggregate having an L.A. abrasion resistance between 28 and 34 percent inclusive and approximately two-thirds by weight stone with an L.A. abrasion resistance between 21 and 27 percent inclusive. Still another embodiment includes one-half by weight of crushed aggregate having an L.A. abrasion resistance between 28 and 34 percent inclusive and approximately one-half by weight stone with an L.A. abrasion resistance between 21 and 27 percent inclusive.

Still other embodiments include an aggregate 14 having a first portion with a higher L.A. abrasion resistance than a second portion where the first portion is between about one-third and about two-thirds by weight of crushed aggregate 14 and the second portion is between about one-third and about two-thirds by weight of crushed aggregate 14.

Microsurfacing composition 28 is approximately ¼" minus dense graded material, and in a specific embodiment, is applied at approximately one-quarter to about three-eighths inch thickness, with the largest stones being embedded to about 75% by the smaller stones of aggregate 14. Dense graded material describes an aggregate whose gradation generally contains, proportionally, many fines or smaller pieces. This embedding allows the larger stones of aggregate 14 which is a portion of microsurfacing composition 28 to stick up and provide a new skid resistance to surface 32. The aggregate which forms a portion of microsurfacing composition 28 has a sand equivalency of over 80 which means that aggregate 14 is very clean, which helps the adhesion of the oil to the stone forming aggregate 14, and which also helps cohesion of microsurfacing composition 28 to itself.

Virtually 100% of aggregate 14 is crushed using an impact crusher. This type of crusher is commonly known in the industry for producing a cubical product, as opposed to compression type crushers. A cubical aggregate in microsurfacing composition 28 provides a tighter matrix within microsurfacing composition 28.

In a specific embodiment, gradation (size) of aggregate 14 is maintained as illustrated in the following table:

| Screen mesh size | Percent of Stone Passing Through |
| --- | --- |
| ⅜" | 100 |
| #4 | 99-99.9 |
| #8 | 79-88 |
| #16 | 59-68 |
| #30 | 41-50 |
| #50 | 29-36 |
| #100 | 18-24 |
| #200 | 12-17 |

Utilization of microsurfacing composition 28 has yielded preliminary test results that are well above the standards exhibited by other known microsurfacing compositions. For instance, in what is known in the microsurfacing industry as the "Six-day Soak" wet track test, microsurfacing composition 28 showed a loss of 16 grams per square foot. International Slurry Surfacing Association guidelines allow a loss of 75 grams per square foot. These test results illustrate that microsurfacing composition 28 has a high adhesion of the asphalt to the stone of aggregate 14 and cohesion of microsurfacing composition 28 to itself that is well above industry norms.

In one embodiment, the asphalt oil referred to herein as a polymer-modified emulsion asphalt oil is a natural latex modified grade CSS-1h (cationic) emulsified asphalt. The grade CSS-1h asphalt is modified with an approved natural latex. The approved natural latex is milled into the asphalt emulsion prior to the emulsification process. The asphaltic emulsion includes 3.0% to 5.0% natural latex solids based on the mass of asphalt (asphalt residual) within the emulsion.

In one embodiment, the emulsified asphalt oil content of microsurfacing composition 28 is between 6.0% to 9.0% as measured by the weight (mass) of aggregate 14. The polymer-modified emulsified asphalt oil within microsurfacing composition 28 is formulated such that when the paving mixture is applied with the relative humidity at not more than 50% and the ambient air temperature of at least 75° F. (24° C.), microsurfacing composition 28 sufficiently cures so that uniformly moving traffic can be allowed in one hour. Additional curing time may be required at locations such as driveways, intersections and where sharp turning movements may take place or where vehicles may accelerate sharply.

Figure 2:
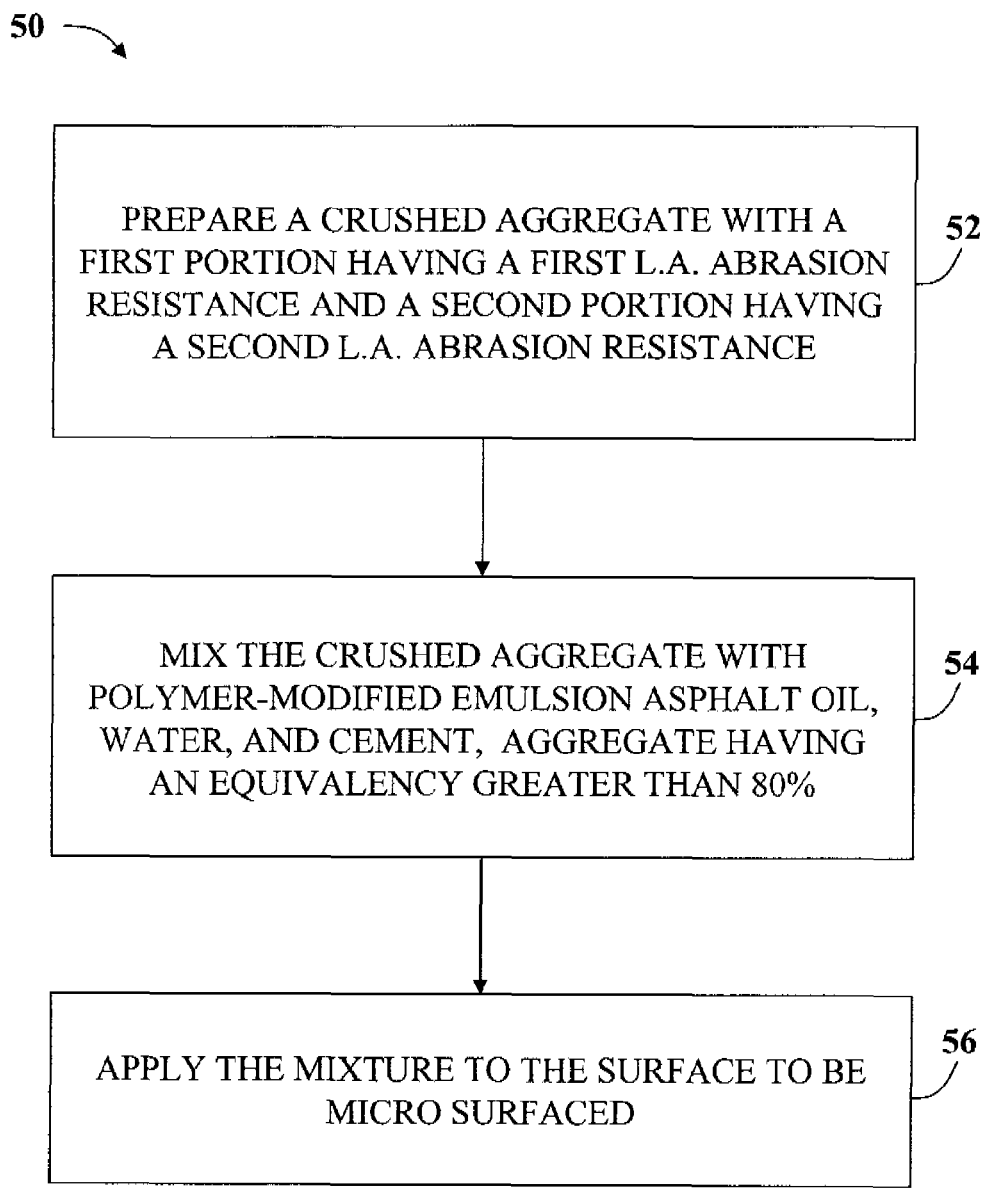
FIG. 2 is a flowchart illustrating a method for microsurfacing a surface.

The above described embodiments of microsurfacing composition 28 provide a method for microsurfacing a surface as illustrated in flowchart 50 of FIG. 2. First, a crushed aggregate is prepared 52 which includes a first portion having an L.A. abrasion resistance between 28 and 34 percent inclusive and a second portion having an L.A. abrasion resistance between 21 and 27 percent inclusive. The crushed aggregate, typically having a sand equivalent value in excess of 80 percent, is mixed 54 with a polymer-modified emulsion asphalt oil, water, and cement. The mixture is applied 56 to the surface to be microsurfaced.

Microsurfacing begins with the selection of high-quality materials (i.e., asphalt, aggregate, emulsifiers, water, and additives) which must pass special laboratory tests, both individually and when combined, in order to be utilized as a microsurfacing system. To be utilized for microsurfacing, microsurfacing composition 28 is capable of being spread in various thick cross-sections (i.e., wedges, ruts, scratch course), which, after initial traffic consolidation, does not further compact (i.e. resists compaction) throughout the entire design tolerance range of bitumen content and variable thicknesses to be encountered. Further, microsurfacing composition 28 maintains a good macro-texture (high wet coefficient of friction) in variable thick sections throughout its service life.

Successful microsurfacing projects depend on strict adherence to technical specifications. The resulting "mix design" (e.g. microsurfacing composition 28) and job specifications are carefully adhered to at application, where ISSA member contractors use specialized job-calibrated equipment and thoroughly trained crews to maintain consistent quality control. With the preceding in mind, microsurfacing composition 28 can be utilized successfully in quick-traffic applications as thin as ⅜ inch (9.5 mm). Further, microsurfacing composition 28 increases skid resistance, color contrast, surface restoration, and service life to high-speed roadways. Surfaces paved with microsurfacing composition 28 can be reopened to traffic within an hour.

As a thin, restorative surface source on urban arterials and heavy traffic intersections, microsurfacing composition 28 can be applied without altering drainage, and there is no loss of curb reveal, which is the exposure of the curb and gutter line of a street, typically formed by concrete. Also, microsurfacing composition 28 can be applied to problem sections of roads or runways to eliminate hydroplaning problems that occur during periods of rain as microsurfacing composition 28 restores the proper surface profile and makes the area safe to use.

Because microsurfacing composition 28 can be effectively applied to most surfaces at ⅜ inches (9.5 mm) or less, more area per ton of mix is covered, resulting in cost-effective surfacing. Microsurfacing composition 28 creates a new, stable surface that is resistant to rutting and shoving in summer and to cracking in winter. Applied to both asphalt and concrete surfaces (usually preceded by a tack coat on concrete), microsurfacing composition 28 can be utilized to restore a skid-resistant surface to slick bridge decking with minimum added dead weight. Microsurfacing composition 28 can also be utilized as a scratch (leveling) course, to be followed by a surface course, to provide transverse surface leveling.

Because of its quick-traffic properties, microsurfacing composition 28 can be applied in a broad range of temperature and weather conditions, effectively lengthening the paving season. Microsurfacing composition 28 is also environmentally safe, emitting minimal pollutant amounts. When applied at ambient temperatures, microsurfacing composition 28 has low energy requirements and its life expectancy usually exceeds seven years.

Microsurfacing composition 28 is capable of filling wheel ruts up to 1½ inches (38 mm) deep when the pavement has stabilized and is not subject to plastic deformation, providing the unique ability to solve rut problems without costly milling.

While the invention has been described in terms of various specific embodiments, those skilled in the art will recognize that the invention can be practiced with modification within the spirit and scope of the claims.

What is claimed is:

1. A composition for microsurfacing of pavement, said composition comprising:
   a polymer-modified emulsion asphalt oil;
   water;
   cement; and
   crushed aggregate comprising a first portion and a second portion, said first portion having a first L.A. abrasion resistance, said second portion having a second L.A. abrasion resistance lower than the first L.A. abrasion resistance, said crushed aggregate comprising a limestone aggregate, said first portion taken from a first ledge of stone and said second portion taken from a second ledge of stone.

2. A composition according to claim 1 wherein said crushed aggregate is from at least one of the Burlington-Keokuk limestone formation, the Elsey-Reeds Spring formation, and the Pierson formation.

3. A composition according to claim 1 wherein said first portion having an L.A. abrasion resistance between about 28 and about 34 percent inclusive, said second portion having an L.A. abrasion resistance between about 21 and about 27 percent inclusive.

4. A composition according to claim 1 wherein said first portion has an L.A. abrasion resistance between about 30 and about 32 percent inclusive and said second portion has an L.A. abrasion resistance between about 23 and about 25 percent inclusive.

5. A composition according to claim 1 wherein said first portion has an L.A. abrasion resistance of about 31 percent and said second portion has an L.A. abrasion resistance of about 24 percent.

6. A composition according to claim 1 wherein said first portion is about two-thirds by weight of said crushed aggregate and said second portion is about one-third by weight of said crushed aggregate.

7. A composition according to claim 1 wherein said first portion is about one-third by weight of said crushed aggregate and said second portion is about two-thirds by weight of said crushed aggregate.

8. A composition according to claim 1 wherein said first portion is about one-half by weight of said crushed aggregate and said second portion is about one-half by weight of said crushed aggregate.

9. A composition according to claim 1 wherein said first portion is between about one-third and about two-thirds by weight of said crushed aggregate.

10. A composition according to claim 1 wherein said second portion is between about one-third and about two-thirds by weight of said crushed aggregate.

11. A composition according to claim 1 wherein said crushed aggregate further comprises aggregate that has been crushed utilizing an impact crusher.

12. A composition according to claim 1 wherein said crushed aggregate has a cubical shape.

13. A composition according to claim 1 wherein larger stones of said crushed aggregate is embedded about 75 percent by smaller stones of said crushed aggregate.

14. A composition according to claim 1 wherein 100 percent of said crushed aggregate passes through a three-eighths inch sieve.

15. A composition according to claim 1 wherein said asphalt oil comprises between about 6 and 9 percent of said composition.

16. A composition according to claim 1 further comprising a portion of sand.

17. A composition according to claim 1 wherein said aggregate has a sand equivalent value of at least about 80 percent.

18. A method for microsurfacing a surface comprising:
preparing a crushed aggregate which includes a first portion and a second portion, the first portion having an L.A. abrasion resistance higher than the L.A. abrasion resistance of the second portion of the crushed aggregate, the crushed aggregate having a sand equivalent value of at least 80 percent, said crushed aggregate comprising a limestone aggregate, said first portion taken from a first ledge of stone and said second portion taken from a second ledge of stone;
mixing the crushed aggregate with a polymer-modified emulsion asphalt oil, water, and cement; and
applying the mixture to the surface to be microsurfaced.

19. A method according to claim 18 wherein preparing a crushed aggregate comprises preparing a crushed aggregate from at least one of the Burlington-Keokuk limestone formation, the Elsey-Reeds Spring formation, and the Pierson formation.

20. A method according to claim 18 wherein preparing a crushed aggregate comprises preparing a crushed aggregate having a cubical shape.

21. A method according to claim 18 wherein said applying comprises applying the mixture at a thickness between about ¼ inch and about ⅜ inch inclusive.

22. A method according to claim 18 wherein said applying comprises applying the mixture at a thickness of about ¼ inch minus dense graded material from the mixture.

23. A method according to claim 18 wherein the first portion has an L.A. abrasion resistance between about 28 and about 34 percent inclusive and a second portion having an L.A. abrasion resistance between about 21 and about 27 percent inclusive.

24. A method according to claim 18 wherein the first portion has an L.A. abrasion resistance between about 30 and 32 percent inclusive and the second portion having an L.A. abrasion resistance between about 23 and 25 percent inclusive.

25. A method according to claim 18 wherein the first portion has an L.A. abrasion resistance of about 31 percent and the second portion has an L.A. abrasion resistance of about 24 percent.

26. A method according to claim 18 wherein the first portion is about two-thirds by weight of the crushed aggregate and the second portion is about one-third by weight of the crushed aggregate.

27. A method according to claim 18 wherein the first portion is about one-third by weight of the crushed aggregate and the second portion is about two-thirds by weight of the crushed aggregate.

28. A method according to claim 18 wherein the first portion is about one-half by weight of the crushed aggregate and the second portion is about one-half by weight of the crushed aggregate.

29. A method according to claim 18 wherein the first portion is between about one-third and about two-thirds by weight of the crushed aggregate.

30. A method according to claim 18 wherein the second portion is between about one-third and about two-thirds by weight of the crushed aggregate.

31. A method according to claim 18 wherein preparing a crushed aggregate further comprises crushing the aggregate utilizing an impact crusher.

32. A crushed aggregate for utilization in microsurfacing of pavement, said crushed aggregate comprising:
a first portion having a first L.A. abrasion resistance; and
a second portion having a second L.A. abrasion resistance, the first L.A. abrasion resistance being higher than the second L.A. abrasion resistance, said crushed aggregate comprising a limestone aggregate, said first portion taken from a first ledge of stone and said second portion taken from a second ledge of stone.

33. A crushed aggregate according to claim 32 wherein said first portion and said second portion are from at least one of the Burlington-Keokuk limestone formation, the Elsey-Reeds Spring formation, and the Pierson formation.

34. A crushed aggregate according to claim 32 wherein said first portion has an L.A. abrasion resistance between about 28 and about 34 percent inclusive and said second portion has an L.A. abrasion resistance between about 21 and about 27 percent inclusive.

35. A crushed aggregate according to claim 32 wherein said first portion has an L.A. abrasion resistance between about 30 and about 32 percent inclusive and said second portion has an L.A. abrasion resistance between about 23 and about 25 percent inclusive.

36. A crushed aggregate according to claim 32 wherein said first portion has an L.A. abrasion resistance of about 31 percent and said second portion has an L.A. abrasion resistance of about 24 percent.

37. A crushed aggregate according to claim 32 wherein said first portion is about two-thirds by weight of said crushed aggregate and said second portion is about one-third by weight of said crushed aggregate.

38. A crushed aggregate according to claim 32 wherein said first portion is about one-third by weight of said crushed aggregate and said second portion is about two-thirds by weight of said crushed aggregate.

39. A crushed aggregate according to claim 32 wherein said first portion is about one-half by weight of said crushed aggregate and said second portion is about one-half by weight of said crushed aggregate.

40. A crushed aggregate according to claim 32 wherein said first portion is between about one-third and about two-thirds by weight of said crushed aggregate.

41. A crushed aggregate according to claim 32 wherein said second portion is between about one-third and about two-thirds by weight of said crushed aggregate.

42. A crushed aggregate according to claim 32 wherein said crushed aggregate has a substantially cubical shape.

43. A crushed aggregate according to claim 32 wherein 100 percent of said crushed aggregate passes through a three-eighths inch sieve.

44. A crushed aggregate according to claim 32 wherein said aggregate has a sand equivalent value of at least 80 percent.

45. A composition for microsurfacing of pavement, said composition comprising:
a polymer-modified emulsion asphalt oil;
water;
cement; and crushed aggregate from the Burlington-Keokuk limestone formation, wherein the aggregate comprises a first portion and a second portion, said first portion having a first L.A. abrasion resistance, said second portion having a second L.A. abrasion resistance lower than the first L.A. abrasion resistance, said first portion taken from a first ledge of stone and said second portion taken from a second ledge of stone.

46. A composition for microsurfacing of pavement, said composition comprising:
a polymer-modified emulsion asphalt oil;
water;
cement; and
crushed aggregate from the Elsey-Reeds Spring formation, wherein the aggregate comprises a first portion and a second portion, said first portion having a first L.A. abrasion resistance, said second portion having a second L.A. abrasion resistance lower than the first L.A. abrasion resistance, said first portion taken from a first ledge of stone and said second portion taken from a second ledge of stone.

47. A composition for microsurfacing of pavement, said composition comprising:
a polymer-modified emulsion asphalt oil;
water;
cement; and
crushed aggregate from the Pierson formation, wherein the aggregate comprises a first portion and a second portion, said first portion having a first L.A. abrasion resistance, said second portion having a second L.A. abrasion resistance lower than the first L.A. abrasion resistance, said first portion taken from a first ledge of stone and said second portion taken from a second ledge of stone.

48. A composition according to claim 1 wherein an edge of said crushed aggregate second portion is configured to sharpen over time to maintain a skid resistance of the pavement.

49. A method according to claim 18 further comprising preparing a crushed aggregate second portion having an edge configured to sharpen over time to facilitate maintaining a skid resistance of the surface.

50. A crushed aggregate according to claim 32 wherein an edge of the second portion is configured to sharpen over time to maintain a skid resistance of the pavement.

51. A composition according to claim 45 wherein an edge of the second portion is configured to sharpen over time to maintain a skid resistance of the pavement.

52. A composition according to claim 46 wherein an edge of the second portion is configured to sharpen over time to maintain a skid resistance of the pavement.

53. A composition according to claim 47 wherein the an edge of second portion is configured to sharpen over time to maintain a skid resistance of the pavement.

* * * * *